(12) United States Patent
Chen et al.

(10) Patent No.: US 11,397,149 B2
(45) Date of Patent: Jul. 26, 2022

(54) LASER RADAR SYSTEM APPARATUS FOR MULTI-WAVELENGTH MEASUREMENT OF ATMOSPHERIC CARBON DIOXIDE CONCENTRATION AND VERTICAL AEROSOL PROFILE

(71) Applicant: Shanghai Institute of Optics and Fine Mechanics, Chinese Academy of Sciences, Shanghai (CN)

(72) Inventors: Weibiao Chen, Shanghai (CN); Yadan Zhu, Shanghai (CN); Jiqiao Liu, Shanghai (CN); Xia Hou, Shanghai (CN); Xiaolei Zhu, Shanghai (CN); Xiuhua Ma, Shanghai (CN); Huaguo Zang, Shanghai (CN); Rui Li, Shanghai (CN)

(73) Assignee: SHANGHAI INSTITUTE OF OPTICS AND FINE MECHANICS, CHINESE ACADEMY OF SCIENCES, Shanghai (CN)

( * ) Notice: Subject to any disclaimer, the term of this patent is extended or adjusted under 35 U.S.C. 154(b) by 0 days.

(21) Appl. No.: 17/281,054

(22) PCT Filed: Jul. 23, 2019

(86) PCT No.: PCT/CN2019/097360
§ 371 (c)(1),
(2) Date: Mar. 29, 2021

(87) PCT Pub. No.: WO2020/063073
PCT Pub. Date: Apr. 2, 2020

(65) Prior Publication Data
US 2021/0349011 A1 Nov. 11, 2021

(30) Foreign Application Priority Data
Sep. 30, 2018 (CN) .......................... 201811154794.1

(51) Int. Cl.
*G01N 21/27* (2006.01)
*G01N 21/25* (2006.01)
(Continued)

(52) U.S. Cl.
CPC .......... *G01N 21/27* (2013.01); *G01N 21/255* (2013.01); *G01N 21/85* (2013.01); *G01S 17/95* (2013.01); *G01N 2021/8578* (2013.01)

(58) Field of Classification Search
CPC ................. G01N 21/27; G01N 21/255; G01N 2021/8578
See application file for complete search history.

(56) References Cited

U.S. PATENT DOCUMENTS

2003/0030001 A1    2/2003  Cooper et al.
2009/0185583 A1*   7/2009  Kuksenkov .......... G02F 1/3532
                                                        372/5

FOREIGN PATENT DOCUMENTS

CN    102288972 A    12/2011
CN    204515135 U     7/2015
(Continued)

OTHER PUBLICATIONS

WeiGong, "The use of 1572 nm Mie LiDAR for observation of the optical properties of aerosols over Wuhan" Aug. 9, 2013 (Year: 2013).*

(Continued)

*Primary Examiner* — Maurice C Smith
(74) *Attorney, Agent, or Firm* — Panitch Schwarze Belisario & Nadel LLP

(57) ABSTRACT

A laser radar system apparatus for the multi-wavelength measurement of the atmospheric carbon dioxide concentration and a vertical aerosol profile, including: a laser transmitting unit; a dual-pulse laser capable of simultaneously transmitting laser having three wavelengths, i.e., 1572 nm, (Continued)

1064 nm, and 532 nm; a transmitting beam expander; a receiving telescope system; a visual axis monitoring module; a photoelectric detection unit; and a data acquisition and processing unit. The laser that simultaneously outputs laser having three wavelengths is used in a laser radar system, and an optical differential absorption method and a high spectral resolution detection method are used, such that the atmospheric carbon dioxide concentration and the vertical aerosol profile can be measured simultaneously and high-precision aerosol monitoring is implemented during the high-precision obtaining of the concentration of the greenhouse gas carbon dioxide.

5 Claims, 1 Drawing Sheet

(51) Int. Cl.
*G01N 21/85* (2006.01)
*G01S 17/95* (2006.01)

(56) References Cited

FOREIGN PATENT DOCUMENTS

| CN | 107193015 A | | 9/2017 |
|---|---|---|---|
| CN | 108444948 A | | 8/2018 |
| CN | 109655843 A | * | 4/2019 |

OTHER PUBLICATIONS

N. Utry, "Wavelength-Dependent Optical Absorption Properties of Artificial and Atmospheric Aerosol Measured by a Multi-Wavelength Photoacoustic Spectrometer", Nov. 16, 2013 (Year: 2013).*

Int'l Search Report dated Oct. 22, 2019 in Int'l Application No. PCT/CN2019/097360.

* cited by examiner

LASER RADAR SYSTEM APPARATUS FOR MULTI-WAVELENGTH MEASUREMENT OF ATMOSPHERIC CARBON DIOXIDE CONCENTRATION AND VERTICAL AEROSOL PROFILE

CROSS-REFERENCE TO RELATED APPLICATIONS

This application is a Section 371 of International Application No. PCT/CN2019/097360, filed Jul. 23, 2019, which was published in the Chinese language on Apr. 2, 2020 under International Publication No. WO 2020/063073 A1, which claims priority under 35 U.S.C. § 119 to Chinese Patent Application No. 201811154794.1, filed on Sep. 30, 2018 the disclosures of all of which are incorporated herein by reference.

TECHNICAL FIELD

The present invention relates to the field of laser radar, and in particular relates to a laser radar system apparatus for multi-wavelength measurement of atmospheric carbon dioxide concentration and vertical aerosol profile.

BACKGROUND

Carbon dioxide gas is the main gas that affects global warming. Aerosols affect atmospheric visibility, have direct and indirect effects on the earth's radiation balance, and also affect global climate change. Therefore, simultaneous research and long-term real-time observation of carbon dioxide gas concentration changes and aerosol vertical profiles are of great significance to meteorological prediction, global radiation balance and atmospheric pollution. Atmospheric detection laser radar is an important method to study atmospheric carbon dioxide concentration and vertical aerosol profile. However, most laser radar systems can only detect one kind of gas and can only be used for foundation tests due to factors such as system weight and volume limitations. A laser radar system that can simultaneously measure atmospheric carbon dioxide concentration and vertical aerosol profile and can carry out airborne or spaceborne detection to achieve real-time and large-scale measurement throughout the day has not yet appeared.

SUMMARY OF THE INVENTION

The purpose of the present invention is to overcome the shortcoming that one gas measuring radar apparatus can only be used to measure one kind of gas, and to provide a multi-wavelength laser radar system apparatus that can simultaneously measure atmospheric carbon dioxide concentration and vertical aerosol profile. The apparatus is suitable for foundation, airborne and spaceborne platforms, and can achieve high-precision and high-resolution gas concentration measurement, and at the same time, can meet the needs of real-time and large-scale measurement throughout the day.

The basic principle of the present invention is to obtain light sources of multiple wavelengths (532/1064/1572 nm) based on seed injection technology combined with lock-in and nonlinear optical technology. The atmospheric carbon dioxide concentration can be obtained by the method of integral path differential absorption through measuring the emitted and received energy of online and offline light at 1572 nm, combined with distance information. The vertical profile of aerosol backscattering coefficient, extinction coefficient, and depolarization ratio can be obtained by the method of high spectral resolution detection. At the same time, the distance of target can be obtained by the laser time-of-flight measurement method.

The technical solutions of the present disclosure are as follows:

A laser radar system for multi-wavelength measurement of atmospheric carbon dioxide concentration and vertical aerosol profile includes 1064 nm seed laser, 1572 nm seed laser, three-wavelength laser (532/1064/1572 nm), transmitting beam expander, receiving telescope system, visual axis module, relay optical unit, photoelectric detection unit, integral ball, collimator, a first spectroscope, a second spectroscope, a third spectroscope, data acquisition and processing unit, reflective mirror. The photoelectric detection unit includes a fourth spectroscope, a fifth spectroscope, a sixth spectroscope, 1572 nm detection optical unit, 1064 nm detection optical unit, 532 nm polarization detection optical unit, 532 nm high spectral detection optical unit, 532 nm parallel polarization detection optical unit, narrow band filter, polarization spectroscope, high spectral filter, 1572 nm detector, 1064 nm detector, 532 nm polarization receiving detector, 532 nm high spectral receiving detector, 532 nm parallel polarization receiving detector. The positional relationship of the above components is as follows:

The output ports of the 1064 nm seed laser and the 1572 nm seed laser are connected to the input port of the three-wavelength laser through the optical fiber. The light beam with a wavelength of 1572 nm emitted by the three-wavelength laser passes through the first spectroscope and is divided into two paths of beams, one path of which passes through the second spectroscope and is divided into two beams, wherein one beam passes through the integral ball and the collimator and is incident on the photoelectric detection unit, while the other beam passes through the reflective mirror and then is incident on the visual axis monitoring module, and the other path of which and the beams with wavelengths of 532 nm and 1064 nm emitted by the three-wavelength laser simultaneously pass through the transmitting beam expander and are incident into the atmosphere. The echo signals of the three wavelengths 532/1064/1572 nm scattered by the atmosphere or the ground are received by the receiving telescope system and then divided into two paths of beams by the third spectroscope divided by the field of view, wherein one path of which is incident into the visual axis monitoring module, and the other path of which passes through the relay optical unit and is incident into the photoelectric detection unit. The output port of the photoelectric detection unit is connected to the input port of the data acquisition and processing unit.

In the photoelectric detection unit, the 1572 nm beam passes through the integral ball and the collimator and is incident on the fourth spectroscope. After passing through the fourth spectroscope and the 1572 nm detection optical unit, it is incident on the 1572 nm detector. The three-wavelength beam passing through the relay optical unit is incident on the fourth spectroscope and is divided into two beams, wherein one beam has a wavelength of 1572 nm, and the other beam has wavelengths of 532 nm and 1064 nm. One beam with the wavelength of 1572 nm passes through the 1572 nm detection optical unit and is incident on the 1572 nm detector, and the other beam with the wavelengths of 532 nm and 1064 nm passes through the fifth spectroscope and is divided into two beams, one of which has a wavelength of 532 nm and the other has a wavelength of 1064 nm. The 1064 nm beam passes through the 1064 nm detection optical unit and is incident on the 1064 nm detector, and the 532 nm beam is incident on the polarization spectroscope, and then it is divided into 532 nm vertical light and parallel light beams. The 532 nm vertical light passes through the 532 nm polarization detection optical unit and is incident on the 532 nm polarization receiving detector, and the 532 nm parallel light passes the sixth spectroscope and is divided into two paths of beams, one path of which sequentially passes through the high spectral filter, 532 nm high spectral detection optical unit and is incident on the 532 nm high spectral receiving detector, and the other path of which passes through the 532 nm parallel polarization detecting optical unit and is incident on the 532 nm parallel polarization receiving detector.

The laser radar system for multi-wavelength measurement of atmospheric carbon dioxide concentration and vertical aerosol profile also comprises a 1572 nm laser frequency lock unit, the output port of which is connected to the input port of the three-wavelength laser through the optical fiber to improve the stability of the 1572 nm laser light frequency.

The visual axis monitoring module is composed of a spectroscope module and a CCD and its function is to monitor the angle between the emitted light beam and the received light beam, to adjust the parallelism of the optical axes of the transmitting and receiving systems and to make the transmitting optical axis match the receiving field of view.

The relay optical unit collimates the optical path, and the converging light received by the receiving telescope system passes through the relay optical unit and becomes parallel light.

The laser radar system for multi-wavelength measurement of atmospheric carbon dioxide concentration and vertical aerosol profile further comprises a narrow band filter, which can be arranged between the fifth spectroscope and the polarization spectroscope to filter out stray light other than 532 nm to reduce the noise from background.

Both the 1572 nm detection optical unit and the 1064 nm detection optical unit contain narrow band filters of corresponding wavelength bands, which can reduce the interference of solar background radiation and other stray light, improve the signal-to-noise ratio, and realize real-time high-precision measurement throughout the day.

The telescope system is a receiving telescope system with its receiving and emitting axes parallel to each other. The data acquisition and processing unit includes a collection card and a data preprocessing module. The 1572 nm detector and the 1064 nm detector may be APD detectors. The 532 nm detector can be a PMT detector.

The advantageous effects of the present invention are:

1. The multi-wavelength laser radar system of the present invention uses both a method of optical differential absorption and a method of high spectral resolution detection in a set of laser radar system, which can simultaneously measure the atmospheric carbon dioxide concentration and the vertical aerosol profile, and achieve high-precision monitoring of aerosols while obtaining the carbon dioxide concentration with high precision. It is not like the traditional aerosol detection laser radar which needs to assume the laser radar ratio to invert the aerosol optical parameters, and this will bring greater errors;

2. The multi-wavelength laser radar system of the present invention is suitable for foundation, airborne and spaceborne platforms, and can carry out global real-time high-precision measurement of atmospheric carbon dioxide concentration and vertical aerosol profile, which is helpful for studying the carbon cycle, and the aerosol can be further classified by vertical profiles of aerosol backscattering coefficient, extinction coefficient, and depolarization ratio, which has a fundamental role in practical use in environmental three-dimensional monitoring;

3. The multi-wavelength laser radar system of the present invention adopts a method of spontaneous detection. A laser source can output laser lights with three wavelengths (532/1064/1572 nm) at the same time, and can work in the day and night at the same time. Each detection optical unit contains narrow band filters of the corresponding wavelength bands, which can reduce the solar background radiation, improve the signal-to-noise ratio and achieve real-time high-precision measurements throughout the day.

DETAILED DESCRIPTION

Figure 1:
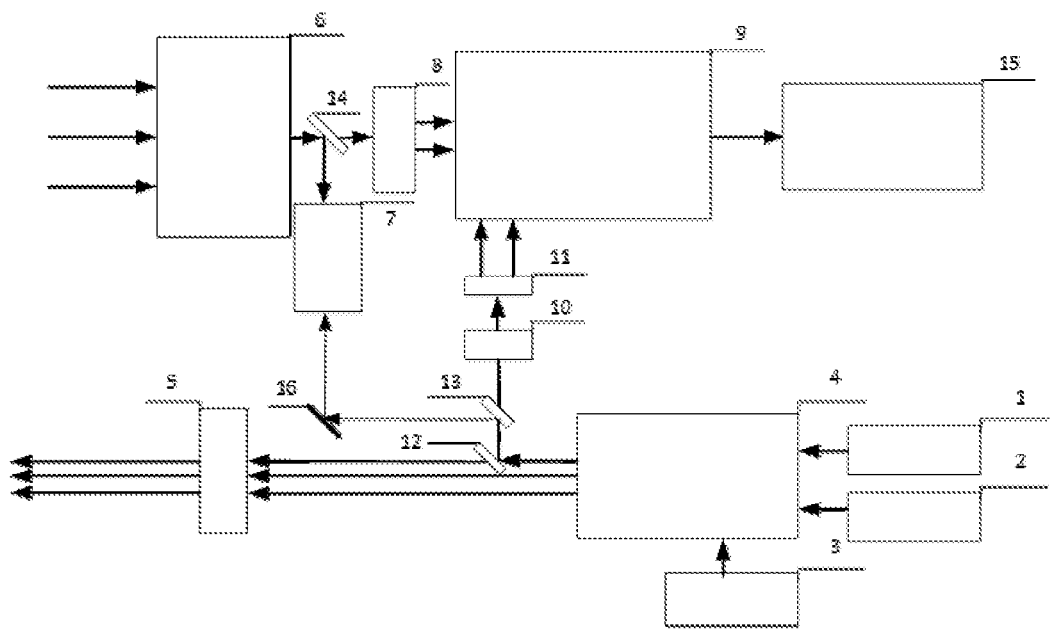
FIG. 1 is a block diagram of the overall structure of a laser radar system apparatus based on multi-wavelength measurement of carbon dioxide concentration and vertical aerosol profile of the present invention. In the figure: 1—1064 nm seed laser, 2—1572 nm seed laser, 3—1572 nm laser frequency lock unit, 4—three-wavelength laser, 5—transmitting beam expander, 6—receiving telescope system, 7—visual axis monitoring module, 8—relay optical unit, 9—photoelectric detection unit, 10—integral ball, 11—collimator, 12—first spectroscope, 13—second spectroscope, 14—third spectroscope, 15—data acquisition and processing unit, 16—reflective mirror.
Figure 2:
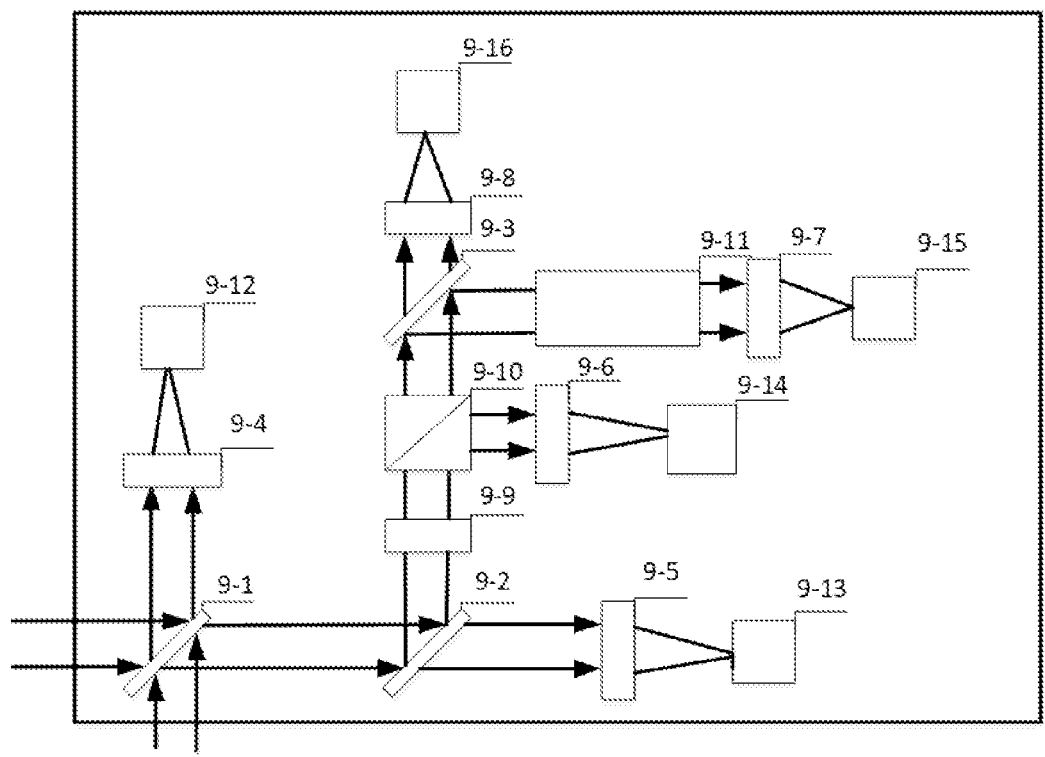
FIG. 2 is a structural block diagram of the photoelectric detection unit of the present invention. In the figure: 9-1—fourth spectroscope, 9-2—fifth spectroscope, 9-3—sixth spectroscope, 9-4—1572 nm detection optical unit, 9-5—1064 nm detection optical unit, 9-6—532 nm polarization detection optical unit, 9-7—532 nm high spectral detection optical unit, 9-8—532 nm parallel polarization detection optical unit, 9-9—narrow band filter, 9-10—polarization spectroscope, 9-11—high spectral filter, 9-12—1572 nm detector, 9-13—1064 nm detector, 9-14—532 nm polarization receiving detector, 9-15—532 nm high spectral receiving detector, 9-16—532 nm parallel polarization receiving detector.

The present invention will be further described below combined with examples and drawings, but the protection scope of the present invention should not be limited by this. FIG. 1 is a block diagram of the overall structure of the laser radar system apparatus based on multi-wavelength measurement of carbon dioxide concentration and vertical aerosol profile of the present invention. As shown in FIG. 1, the laser radar system for multi-wavelength measurement of atmospheric carbon dioxide concentration and vertical aerosol profile includes 1064 nm seed laser 1, 1572 nm seed laser 2, 1572 nm laser frequency lock unit 3, three-wavelength laser (532/1064/1572 nm) 4, transmitting beam expander 5, receiving telescope system 6, visual axis monitoring module 7, relay optical unit 8, photoelectric detection unit 9, integral ball 10, collimator 11, a first spectroscope 12, a second spectroscope 13, a third spectroscope 14, data acquisition and processing unit 15, reflective mirror 16. The photoelectric detection unit comprises a fourth spectroscope 9-1, a fifth spectroscope 9-2, a sixth spectroscope 9-3, 1572 nm detection optical unit 9-4, 1064 nm detection optical unit 9-5, 532 nm polarization detection optical unit 9-6, 532 nm high spectral detection optical unit 9-7, 532 nm parallel polarization detection optical unit 9-8, narrow band filter 9-9, polarization spectroscope 9-10, high pectral filter 9-11, 1572 nm detector 9-12, 1064 nm detector 9-13, 532 nm polarization receiving detector 9-14, 532 nm high spectral receiving detector 9-15, 532 nm parallel polarization receiving detector 9-16. The positional relationship of the above components is as follows:

The output ports of the 1064 nm seed laser 1, the 1572 nm seed laser 2, the 1782 nm laser frequency lock unit 3 are connected to the input port of the three-wavelength laser 4 through the optical fiber, and the 1572 nm beam emitted by the three-wavelength laser 4 passes through the first spectroscope 12 and is divided into two paths of beams, One path of which passes through the second spectroscope 13 and is divided into two beams, wherein one beam passes through the integral ball 10 and the collimator 11 and is incident on the photoelectric detection unit 9, while the other beam passes through the reflective mirror 16 and then is incident on the visual axis monitoring module 7, and the other path of which and the beams with wavelengths of 532 nm and 1064 nm emitted by the three-wavelength laser 4 simultaneously pass through the transmitting beam expander 5 and are incident into the atmosphere. The echo signals of the three wavelengths 532/1064/1572 nm scattered by the atmosphere or the ground is received by the receiving telescope system 6 and then divided into two paths of beams by the third spectroscope 14 divided by the field of view, wherein one path of which is incident into the visual axis monitoring module 7, and the other path of which passes through the relay optical unit 8 and is incident into the photoelectric detection unit 9. The output port of the photoelectric detection unit 9 is connected to the input port of the data acquisition and processing unit 15.

In the photoelectric detection unit 9, the 1572 nm beam passes through the integral ball 10 and the collimator 11 and is incident on the fourth spectroscope 9-1. After passing through the fourth spectroscope 9-1 and the 1572 nm detection optical unit 9-4, it is incident on the 1572 nm detector 9-12. The three-wavelength beam passing through the relay optical unit 8 is incident on the fourth spectroscope 9-1 and is divided into two beams, wherein one beam has a wavelength of 1572 nm, and the other beam has wavelengths of 532 nm and 1064 nm. One beam with the wavelength of 1572 nm passes through the 1572 nm detection optical unit 9-4 and is incident on the 1572 nm detector 9-12, and the other beam with the wavelengths of 532 nm and 1064 nm passes through the fifth spectroscope 9-2 and is divided into two beams, one of which has a wavelength of 532 nm and the other has a wavelength of 1064 nm. The 1064 nm beam passes through the 1064 nm detection optical unit 9-5 and is incident on the 1064 nm detector 9-13, and the 532 nm beam is incident on the polarization spectroscope, and then it is divided into 532 nm vertical light and parallel light beams. passes through the narrow band filter 9-9 and is incident on the polarization spectroscope 9-10, and then it is further divided into two beams, 532 nm vertical light and parallel light beams. The 532 nm vertical light passes through the 532 nm polarization detection optical unit 9-6 and is incident on the 532 nm polarization receiving detector 9-14, and the 532 nm parallel light passes the sixth spectroscope 9-3 and is divided into two paths of beams, one path of which sequentially passes through the high spectral filter 9-11, 532 nm high spectral detection optical unit 9-7 and is incident on the 532 nm high spectral receiving detector 9-15, and the other path of which passes through the 532 nm parallel polarization detecting optical unit 9-8 and is incident on the 532 nm parallel polarization receiving detector 9-16.

The specific process of the laser radar system based on multi-wavelength measurement of carbon dioxide and aerosol concentration implemented in the present invention is:

① Through the fourth spectroscope 9-1, the 1572 nm echo signal received by the receiving telescope system 6 and the 1572 nm monitoring signal output by the integral ball 10 and collimator 11 simultaneously pass through the 1572 nm detection optical unit 9-4 and are incident on the 1572 nm detector 9-12. The light energy of the obtained echo signal 1572 nm online and 1572 nm offline is $E_1$ and $E_2$, respectively, and the light energy of the monitoring signal 1572 nm online and 1572 nm offline is $E_3$ and $E_4$, respectively. Consequently, the atmospheric carbon dioxide column concentration is $X_{CO_2}=\log\ ((E_2 \cdot E_3)/(E_1 \cdot E_4))/2IWF$, wherein IWF is the weight function related to the absorption cross section of carbon dioxide molecule and is related to temperature, humidity, pressure of the atmospheric and laser light working wavelength.

② Split 532 nm beam and 1064 nm beam through the fifth spectroscope 9-2. The backscattering power of the vertical polarization channel can be obtained when the 532 nm beam passes through the narrow band filter 9-9, the polarization spectroscope 9-10 and the 532 nm polarization detection optical unit 9-6 and then is incident on the 532 nm polarization receiving detector 9-14. The backscattering power of the high spectral channel $P_M^\|$ can be obtained when passing through the narrow band filter 9-9, the polarization spectroscope 9-10, the high spectral filter 9-11 and the 532 nm high spectral detection optical unit 9-7 and then is incident on the 532 nm high spectral receiving detector 9-15. The backscattering power of the horizontal polarization channel $P_C^\|$ can be obtained when passing through the narrow band filter 9-9, the polarization spectroscope 9-10 and the 532 nm parallel polarization detection optical unit 9-8 and then is incident on the 532 nm parallel polarization receiving detector 9-16. The vertical profile of the aerosol backscattering coefficient, extinction coefficient, and depolarization ratio can be obtained with the radar equation $P_C^\perp(R)=K_1(\beta_m^\perp+\beta_a^\perp)\ \exp\ [-2\int_0^R(\alpha_m+\alpha_a)dr]/R^2$, $P_M^\|(R)=K_2(T_m\beta_m^\|+T_a\beta_a^\|)\exp[-2\int_0^R(\alpha_m+\alpha_a)dr]/R^2$ and $P_C^\|(R)=K_3(\beta_m^\|+\beta_a^\|)\exp[-2\int_0^R(\alpha_m+\alpha_a)dr]/R^2$, wherein $K_1$, $K_2$ and $K_3$ are constants of the three channel systems, respectively, $\beta_m^\perp$ and $\beta_a^\perp$ are the backscattering coefficients of molecules and aerosols in vertical channels, respectively, and $\beta_m^\|$ and $\beta_a^\|$ are the backscattering coefficients of molecules and aerosols in parallel channels, respectively, and $\alpha_m$ and $\alpha_a$ are the extinction coefficients of molecules and aerosols, respectively, and $T_m$ and $T_a$ are transmittance of the molecules and aerosols when passing through high spectral filter, respectively.

What is claimed is:

1. A laser radar system apparatus for multi-wavelength measurement of atmospheric carbon dioxide concentration and vertical aerosol profile, wherein the apparatus comprises a 1064 nm seed laser (1), a 1572 nm seed laser (2), a three-wavelength laser (4), a transmitting beam expander (5), a receiving telescope system (6), a visual axis monitoring module (7), a relay optical unit (8), a photoelectric detection unit (9), an integral ball (10), a collimator (11), a first spectroscope (12), a second spectroscope (13), a third spectroscope (14), a data acquisition and processing unit (15), an reflective mirror (16);

wherein the photoelectric detection unit (9) includes a fourth spectroscope (9-1), a fifth spectroscope (9-2), a sixth spectroscope (9-3), a 1572 nm detection optical unit (9-4), a 1064 nm detection optical unit (9-5), a 532 nm polarization detection optical unit (9-6), a 532 nm high spectral detection optical unit (9-7), a 532 nm parallel polarization detection optical unit (9-8), a polarization spectroscope (9-10), a high spectral filter (9-11), a 1572 nm detector (9-12), a 1064 nm detector (9-13), a 532 nm polarization receiving detector (9-14), a 532 nm high spectral receiving detector (9-15), a 532 nm parallel polarization receiving detector (9-16); wherein:

the output ports of the 1064 nm seed laser (1), the 1572 nm seed laser (2) are connected to the input port of the three-wavelength laser (4) through optical fiber, and a 1572 nm beam emitted by the three-wavelength laser (4) passes through the first spectroscope (12) and is divided into two paths of beams, one path of which passes through the second spectroscope (13) and being divided into two beams, wherein one beam passes through the integral ball (10) and the collimator (11) and is incident on the photoelectric detection unit (9), while the other beam passes through the reflective mirror (16) and then is incident on the visual axis monitoring module (7); and the other path of which and the beams with wavelengths of 532 nm and 1064 nm emitted by the three-wavelength laser (4) simultaneously pass through the transmitting beam expander (5) and are incident into the atmosphere; and the echo signals of the three wavelengths 532/1064/1572 nm scattered by the atmosphere or ground are received by the receiving telescope system (6) and then divided into two paths of beams by the third spectroscope (14) divided by the field of view; wherein one path of which is incident into the visual axis monitoring module (7), and the other path of which passes through the relay optical unit (8) and is incident into the photoelectric detection unit (9); and the output port of the photoelectric detection unit (9) is connected to the input port of the data acquisition and processing unit (15);

in the photoelectric detection unit (9), the 1572 nm light passes through the integral ball (10) and the collimator (11) and is incident on the fourth spectroscope (9-1), and after passing through the fourth spectroscope (9-1) and the 1572 nm detection optical unit (9-4), it is incident on the 1572 nm detector (9-12); and the three-wavelength beam passing through the relay optical unit (8) is incident on the fourth spectroscope (9-1) and is divided into two beams, wherein one beam has a wavelength of 1572 nm, and the other beam has wavelengths of 532 nm and 1064 nm;

and the beam with the wavelength of 1572 nm beam passes through the 1572 nm detection optical unit (9-4) and is incident on the 1572 nm detector (9-12), and the other beam with the wavelengths of 532 nm and 1064 nm passes through the fifth spectroscope (9-2) and is divided into two beams, one of which has a wavelength of 532 nm and the other has a wavelength of 1064 nm; the 1064 nm beam passes through the 1064 nm detection optical unit (9-5) and is incident on the 1064 nm detector (9-13), and the 532 nm beam is incident on the polarization spectroscope (9-10), and then it is divided into 532 nm vertical light and parallel light beams; and the 532 nm vertical light passes through the 532 nm polarization detection optical unit (9-6) and is incident on the 532 nm polarization receiving detector (9-14), and the 532 nm parallel light passes the sixth spectroscope (9-3) and is divided into two paths of beams; one path of which sequentially passes through the high spectral filter (9-11), 532 nm high spectral detection optical unit (9-7) and is incident on the 532 nm high spectral receiving detector (9-15), and the other path of which passes through the 532 nm parallel polarization detecting optical unit (9-8) and is incident on the 532 nm parallel polarization receiving detector (9-16).

2. The apparatus according to claim 1, wherein the three-wavelength laser (4) is a multi-wavelength laser which simultaneously outputs three wavelengths of 532 nm, 1064 nm, and 1572 nm, and the wavelength of 1572 nm pulsed light is locked with the wavelength of 1572 nm seed laser (2), and the wavelength of 1064 nm pulsed light is locked with the wavelength of 1064 nm seed laser.

3. The apparatus according to claim 1, wherein the apparatus further comprises a 1572 nm laser frequency lock unit (3).

4. The apparatus according to claim 1, wherein the photoelectric detection unit (9) further comprises a narrow band filter (9-9).

5. The apparatus according to claim 1, wherein the apparatus adopts both a method of optical differential absorption and a method of high-spectral resolution detection technology, and finally achieves the atmospheric carbon dioxide concentration and the vertical aerosol profile can be measured simultaneously.

\* \* \* \* \*